DIRECTION-SIGNAL-CANCELLING MECHANISM

Original Filed March 31, 1970 2 Sheets-Sheet 1

INVENTORS
Masaru Suzuki and
BY Yoshihiro Kawai
Schlesinger, Fitzsimmons & Schlesinger
Attorneys

DIRECTION-SIGNAL-CANCELLING MECHANISM

Original Filed March 31, 1970 2 Sheets-Sheet 2

INVENTORS
Masaru Suzuki and Yoshihiro Kawai
BY
Schlesinger, Fitzsimmons & Schlesinger
Attorneys United States Patent Office Re. 27,971
Reissued Apr. 16, 1974

27,971
DIRECTION-SIGNAL-CANCELLING MECHANISM

Masaru Suzuki, Chiryu, and Yoshihiro Kawai, Nagoya, Japan, assignors to Kabushiki-Kaisha Tokai Rika Denki Seisakusho, Aichi-ken, Japan Original No. 3,609,264, dated Sept. 28, 1971, Ser. No. 24,101, Mar. 31, 1970. Application for reissue July 19, 1973, Ser. No. 380,987
Claims priority, application Japan, Sept. 13, 1969, 44/87,296
Int. Cl. H01h *3/16*
U.S. Cl. 200—61.34 3 Claims

Matter enclosed in heavy brackets [ ] appears in the original patent but forms no part of this reissue specification; matter printed in italics indicates the additions made by reissue.

ABSTRACT OF THE DISCLOSURE

A direction-signal-cancelling mechanism which is releasably assembled into the direction-signal indicating apparatus of a vehicle comprises an axially projecting tubular column integral with the base of said indicating apparatus and having a bore diameter sufficient for a steering shaft to extend therethrough, an annular cam member having a bore diameter also sufficient for the steering shaft to extend therethrough and provided at its periphery with at least one axially extending lobe and at its upper end with at least one axially extending pin which is integral with said cam member and engageable in a counterbore provided in the steering wheel for interconnecting the cam member and the steering wheel when said wheel is rotated and said pin and counterbore come into alignment with each other, either one of said tubular column and said cam member being insertedly mounted on the other so as to permit said cam member to be axially slidable and rotatable and to permit said lobe to project radially outwardly to engage a latch means on the indicating apparatus to effect automatic cancelling of the vehicle's direction signals, a spring means compressed between a flange provided on the cam member and the tubular column yieldably urging the cam member as a whole upwardly towards the steering wheel, and a flange provided on either one of said tubular column or said cam member limiting the extent of upward movement of said cam member.

Figure 1:
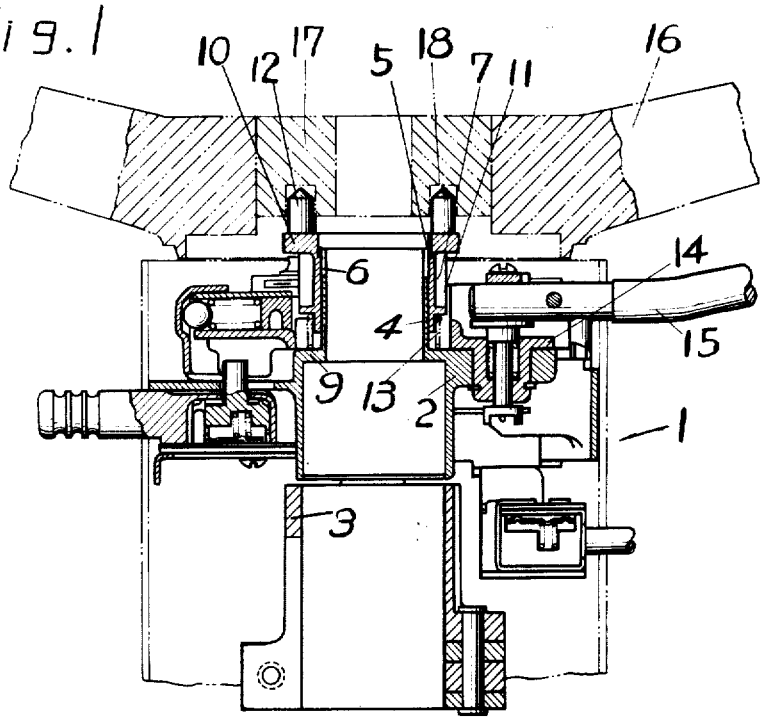

This invention relates to a direction-signal-cancelling mechanism of a vehicle, and more particularly it relates to a direction-signal-cancelling mechanism which can readily be assembled into a conventional direction-signal indicating apparatus.

There has been proposed a number of direction-signal-cancelling mechanisms which are independent of but driven by a vehicle's steering mechanism so as to effect cancelling a direction signal in response to turning movements of the steering mechanism. One such mechanism has been disclosed in U.S. Pat. No. 3,413,426, in which a pin or plunger, which is separate from a rotatable cam member and slidably carried in a bore formed in said member, is yieldably projected toward the steering wheel for interconnecting said steering wheel in alignment with said rotatable cam member. However, there are several economic and structural disadvantages in such cancelling mechanisms. To wit, said pin or plunger has to be made separate from the rotatable cam member, thereby increasing the number of compositions constituting the mechanism, and said bore has to be formed on the cam member with radially inwardly extending projections at the mouth thereof to limit the extent of the projection of the pin or plunger. It is quite difficult and requires highly skilled technicians to form such projections, without losing their strength to withstand the torsional moment imparted thereto by the pin in response to rotation of the steering shaft. Moreover, since said pin in projected yieldably toward the steering wheel by a comparatively small coil spring stored in the bore, the interconnection between the cam member and steering wheel or shaft is poor.

It is a principal object of the present invention to provide direction-signal-cancelling mechanism [releaseably] *releasably* assembled into a direction-signal indicating apparatus of a vehicle, which comprises an axially projecting tubular column integral with a base member of said indicating apparatus and having a bore diameter sufficient for a steering shaft to extend therethrough, an annular cam member having a bore diameter also sufficient for the steering shaft to extend therethrough and provided at its periphery with at least one axially extending cam lobe and at its upper end with at least one axially extending pin which is integral with said cam member and engageable in a counterbore provided in the steering wheel for interconnecting the cam member and the steering wheel when said wheel is rotated and said pin and counterbore come into alignment with each other, either one of said tubular column and cam member being insertedly mounted on the other so as to permit said cam member to be axially slidable and rotatable and to permit the aforementioned lobe to project radially outwardly for engagement with a latch means of the indicating apparatus to effect automatic cancelling of the vehicle's direction signals, a spring means being compressed between a flange provided on the cam member and the tubular column so as to yieldably urge the cam member as whole upwardly towards the steering wheel, and a flange being provided on either said tubular column or said cam member so as to limit the extent of the projection of said cam member, and in which the number of components constituting the mechanism is lessened and the positive interconnection between the mechanism and steering shaft through the steering wheel is assured.

Other objects and advantages of the present invention will become apparent from the following description.

Figure 2:
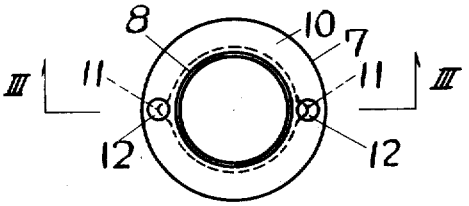
Figure 4:
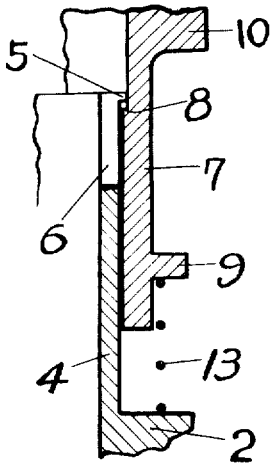
Figure 3:
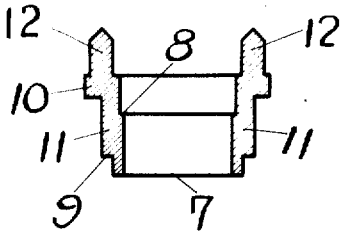
Figure 5:
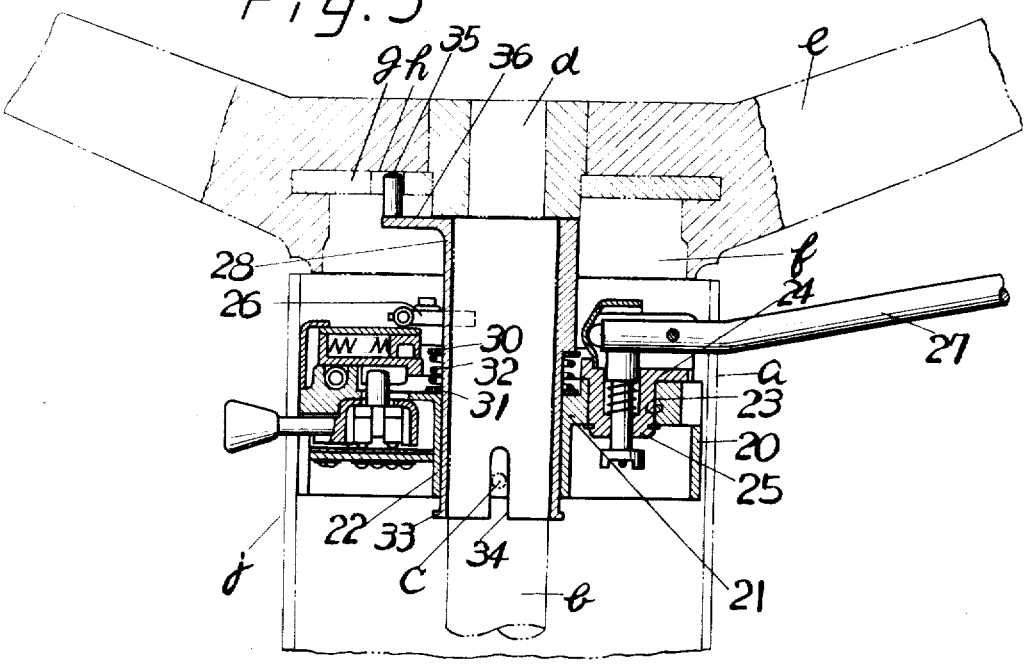
Figure 6:
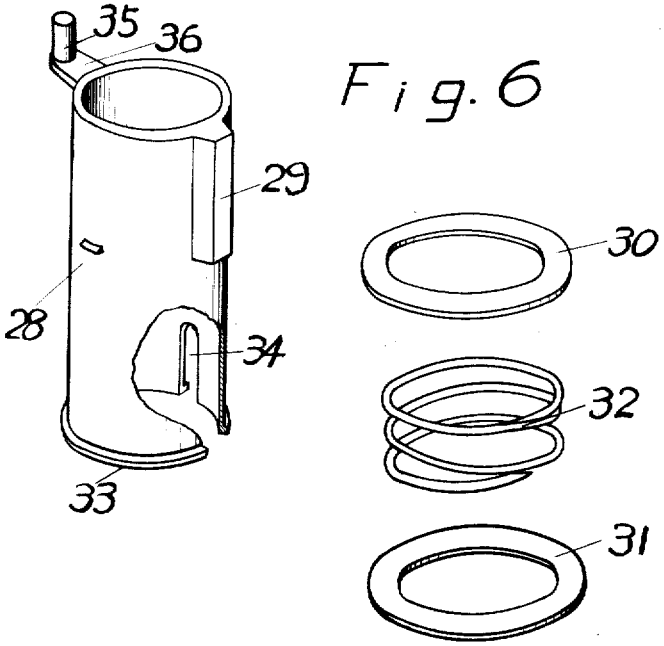

In the accompanying drawing,

FIG. 1 is a cross-sectional view of one embodiment of the direction-signal-cancelling mechanism made in accordance with the present invention, FIG. 2 is an enlarged plan view of the cam member, FIG. 3 is a sectional view of FIG. 2 taken along the line III—III, FIG. 4 is an enlarged partial cross-sectional view of the tubular column with the cam member, FIG. 5 is a cross-sectional view of another embodiment of the direction signal cancelling mechanism, and FIG. 6 is a disassembled perspective view of the cam member of the second embodiment shown in FIG. 5.

In the first embodiment of the direction-signal-cancelling mechanism illustrated in FIGS. 1 to 4, a housing 1 accommodates therein a base member 2 generally extending transversely to the axial direction of housing 1 and having in its central portion a tubular section which extends substantially coaxially with the axis of the housing and allows the steering shaft to freely extend therethrough. For this purpose the base member 2 is provided with a tubular column 4 which is integral with said base member and projects upwardly from the said base member coaxially with the tubular section of said member. Said tubular column 4 has a diameter smaller than that of the tubular section and allows the steering shaft to slidably extend therethrough. It is provided at its upper free end with a flange 5 which extends slightly radially.

Another tubular column 3 is provided in the housing adjacent to and coaxial with the tubular section of said housing, which has a comparatively large diameter and guides the steering shaft for passing into the tubular section and tubular column 4.

Numeral 6 indicates a plurality of slits extending axially and equiangularly around the circumferential wall of tubular column 4 at its upper portion, which give said upper portion of the tubular column such resiliency that said upper portion temporarily is reduced in diameter when it is pressed inwardly from the outside.

As best seen in FIGS. 2 to 4, an annular direction-signal-cancelling cam member 7, which has a bore diameter substantially corresponding to the outside diameter of the tubular column 4 *and* which is provided adjacent its lower end with a radially extending flange 9 and at its upper portion with a neck which has a bore diameter larger than the outside diameter of the tubular column 4, *surrounds column 4*. The neck, which is provided with a shoulder 8 and a radially extending flange 10, is slidably fitted onto said tubular column 4. This insertion of the tubular column into the cam member is readily made by the provision of the aforementioned slits 6. The width of said shoulder 8, which is equal to the bore diameter of the aforementioned neck, substantially corresponds to the width of the flange 5. From the upper surface of the flange 10, pins 12, which are integral with said flange, are axially projected. Cam lobes 11 are provided on the peripheral surface of the cam member 7 between its upper flange 10 and lower flange 9, which extend axially and radially from said surface. A spring 13 mounted between the lower flange 9 and base member 2 urges the cam member 7 axially upwardly until the shoulder 8 of *the* cam member abuts against the flange 5 of the tubular column 4.

Numeral 14 indicates a direction-signal actuating bracket member which is mounted on the base member 2 by a shaft so as to be horizontally rockable with the latter, by the operation of a lever 15 fitted to said shaft, from a neutral position to one of two positions where either a right or left direction signal lamp is actuated. A latch means, which projects into a path of movement of the cam lobes 11 and cooperates with said lobes for returning the actuating member 14 to neutral position in response to the movement of the lobes, it provided on said actuating member; the explanation and illustration of such latch means are omitted, since it is conventional and does not constitute part of the present invention.

A steering wheel 16 is fitted to the free upper end of the steering shaft by a central hole of hub 17 of the steering wheel. It is provided on the inner surface of hub 17 with counterbores 18 which respectively extend axially and are of a size to accommodate therein the upper parts of pins 12 of the cam member 7. When the steering wheel 16 is assembled to a steering shaft mounted in the housing 1, the annular cancelling cam 7 accommodated in said housing is pressed downwardly against the biasing spring 13, pins 12 being depressed by the inner surface of hub 17, unless the counterbores 18 on said surface and said pins 12 are brought into alignment. When the steering wheel 16 is rotated and said bores and pins come in alignment with each other, the cam member 7 is urged upwardly by the spring 13, resulting in aligning the counterbores with the pins, as illustrated in FIG. 1.

In the direction-signal-cancelling mechanism described above, the tubular column 4 which slidably carries the upper part of steering shaft and as well movably supports the annular direction-signal-cancelling cam member 7 can easily be made integral with the base member 2 by molding from synthetic resins, thereby resulting in making the whole structure much simpler compared to conventional cancelling mechanisms and can easily be made in the same molding operation so as to be provided at its upper portion with the flange 5 and slits 6 which permit said column to resiliently accept the mounting of the cam member 7 over it, to effectively support said member and positively limit the extent of the projection of said member. It should be noted that said flange and slits can easily be molded of synthetic resins with no difficulties and without adversely affecting their mechanical strength, since the tubular column 4 has comparatively large dimension. It is one of the advaantages of the present direction-signal-cancelling mechanism that the annular cam member 7 can easily be made, by means of injection molding of synthetic resins for instance, integral with the shoulder 8, cam lobes 11 and pins 12. Said pins 12, which are made integrally with the cam member and have uniform diameter along their entire lengths, could have, as mentioned in the foregoing, sufficient mechanical strength to withstand the torsional force exerted thereupon upon rotation of the steering wheel.

Said cam member 7 can easily be mounted on the tubular column 4 which is integral with the base member 2 of the mechanism and firmly be supported by the latter as a component thereof, whereby the loss of said cam member before fitting it to the steering wheel can completely be avoided.

In the second embodiment of a direction-signal-cancelling mechanism in accordance with the present invention illustrated in FIGS. 5 and 6, said mechanism generally indicated by the letter a comprises a housing 20 which accommodates therein a generally horizontally extending base member 21 provided at its central portion with a tubular column 22 which is integrally made with the base member 21 by means of injection molding of synthetic resins for instance and extends substantially coaxially with the axis of the housing 20 and downwardly from said base member. Similarly to the first embodiment described in the foregoing and illustrated in FIGS. 1 through 4, a direction-signal actuating bracket member 24 is horizontally rockably mounted on base member 21 by a shaft 25 which is rotatably fitted into a hole 23 provided in said base member offset from the tubular column 22 and eccentric to the axis of the housing 20. Said actuating member is operable by a lever 27 from a neutral position to a second position where either a right or left direction signal lamp is actuated. Numeral 26 indicates a pair of latch means (though only one of them is shown in the drawing for the sake of simplicity thereof) extending horizontally and radially outwardly from the actuating member 24 so as to project into the path of movement of a cam lobe 29 of an annular direction-signal-cancelling cam member 28 to cooperate with said lobe for returning the actuating member 24 to its original neutral position in response to the movement of the steering shaft b by the steering wheel e.

Said annular direction-signal-cancelling cam member 28 is, as best shown in FIG. 6, a tubular body having its outer diameter slightly larger than the diameter of steering shaft b and rotatably and slidably fitted into the tubular column 22. Said annular cam member 28 is provided at its lower end with a radially extending flange 33 for limiting the extent of the projection of said member with a slit opening 34 axially extending upwardly. To the upper end of the member 28, there is provided a radially extending flange 36 which is integral with said member and has a pin 35. Said pin 35, which is integral with the flange 36, projects upwardly from the latter and has such a diameter that it can engage in the bore h in disk plate g fitted on the lower surface of the hub f of the steering wheel e. The aforementioned cam lobe is integral with the annular cam member 28, and projects radially from its periphery and extends axially from the upper end of the member 28 a predetermined angular distance from the flange 36. It is preferable to provide a wedge on the periphery of the cam member 28 at the location other than the cam lobe 29 but corresponding to the lower end of said cam lobe, which cooperates with said end to support a washer 30 horizontally thereunder. The annular cam member 28 has mounted on its periphery a coil spring 32 which is yieldable between the aforementioned washer 30 and another washer 31 supported by the base member 21, *and* can readily be assembled into the cancelling mechanism a by inserting its lower end into the upper opening of the tubular column 22 while compressing said lower end inwardly to temporarily and resiliently reduce the circumferential dimension of flange 33 with the assistance of the slit opening 34 and by passing said end through the tubular column until the flange 33 comes out from the lower opening of said flange. Thereby, the spring 32 is yieldably compressed between the upper washer 30 and the lower washer 31 which rests on the upper end of the tubular column 22, and urges the cancelling cam member 28 upwardly until the flange 33 abuts against the lower end of said tubular column. The letter d indicates a central hole in the steering wheel e which is to be fixedly fitted on the free end of the steering shaft b.

The manner of the assembly of the cancelling mechanism a in accordance with the second embodiment of the present invention to the steering wheel e is like that described in the foregoing in connection with the first embodiment, and the advantages of this second embodiment are also the same as those mentioned in the foregoing in connection with the first embodiment.

It should be noted that there is an additional advantage, which has not been mentioned in relation with the first embodiment though it is common to this second embodiment and the first embodiment that the biasing spring 13 in the case of the first embodiment and the spring 32 in the case of the second embodiment works over the entire circumferential edge of the cam member 7 or 28, whereby the close contact of its upper end with the steering wheel 16 or e is assured.

Having thus described our invention, what we claim is:

1. A direction-signal-cancelling mechanism, releasably assembled in a direction-signal-indicating apparatus that includes a latch means, for use in a vehicle which has a steering wheel [having a counterbore], and a steering shaft, comprising an axially projecting tubular column having *a*[n integrally formed] base [member] *portion* and having a bore diameter sufficient for said steering shaft to extend therethrough, a hollow annular cam member having a bore diameter sufficient for the steering shaft to extend therethrough and provided [integrally] at its periphery with a flange and with at least one axially extending cam lobe, [and at its upper end with] at least one axially [upwardly] extending pin [which is integral with] *on one of* said cam member *and said steering wheel at their confronting faces* and engageable [with said] *in a* counterbore [of said] *in the other of said cam member and* steering wheel for interconnecting the cam member and the steering shaft through the steering wheel when said wheel is rotated until said pin and counterbore come into alignment with each other, said tubular column and said cam member being insertedly mounted on each other [and having means] to permit said cam member to be axially slidable and rotatable, the aforementioned cam lobe projecting radially outwardly for engagement with said latch means to effect automatic cancelling of the vehicle's direction signals, [one of said tubular column and said cam member being provided with at least one slit opening,] spring means yieldably supported between said flange [provided on said cam member] and [the] *said* tubular column so as to yieldably urge the cam member as a whole axially upwardly towards the steering wheel, and [a flange] *means* provided on one of said tubular column and said cam member so as to limit the extent of said movement of said cam member.

2. A direction-signal-cancelling mechanism [releaseably] *releasably* assembled into a direction signal indicating apparatus in a vehicle as claimed in claim 1, in which said tubular column has [the] *a* smaller bore diameter than the cam member and is insertedly mounted [on] *in* the latter, and in which there is provided *at least* a [plurality of slits] *slit* extending axially downwardly from the upper end of the tubular column, said spring means is yieldably supported between the flange provided on the cam member adjacent its lower end and the base portion of the tubular column [in such a way that it] *and* surrounds the tubular column, and the *means* [flange], which limits the extent of movement of said cam member, is provided at the upper end of the tubular column and extends slightly radially outwardly so as to abut with a shoulder provided to the inner peripheral wall of the cam member.

3. A direction-signal-cancelling mechanism releasably assembled into a direction signal indicating apparatus in a vehicle as claimed in claim 1, in which said cam member has [the] *a* smaller bore diameter than the tubular column and is insertedly mounted [on] *in* the latter, [said] *and in which there is provided a* slit opening [extends] *extending* axially upwardly from the lower end of the cam member, and the [flange] *means*, which limits the extent of movement of said cam member, is provided on the lower end of the cam member, which abuts with the lower end of the tubular column and cooperates with the latter for limiting the extent of said movement of said cam member.

References Cited

The following references, cited by the Examiner, are of record in the patented file of this patent or the original patent.

UNITED STATES PATENTS 3,413,426 11/1968 McClure et al. ------- 200—61

JAMES R. SCOTT, Primary Examiner